3,234,158
FLOOR POLISH
Helmuth L. Pfluger, Huntingdon Valley, and Charles G. Gebelein, Philadelphia, Pa., assignors to The Borden Company, New York, N.Y., a corporation of New Jersey
No Drawing. Filed Aug. 30, 1962, Ser. No. 220,560
9 Claims. (Cl. 260—28.5)

This invention relates to a coating composition for plastics, paper, metal or the like. The composition is particularly useful as a floor polish, as on linoleum and vinyl, rubber and asphalt floor tile.

Floor polishes should withstand the alternate freezing and thawing of the aqueous emulsion in which form it is stored and shipped, give when applied a continuous smooth and bright film that is removable from a floor by alkali scrubbing and for some purposes at least have a resin base that it light in color so as to avoid the yellow or brown color arising from the use of shellac or the like as the sole or principal resin of the polish.

The present invention provides a polish with a resinous interpolymer base which meets these requirements and also lowers the cost per pound of the resin below the cost of shellac.

The invention provides a polish in which the principal film-forming component in the desired high proportion of it is so scuff resistant (hard) as not to coalesce as a continuous film as it dries in contact with either an alkali soluble resin or coalescing agent, both described herein, but will coalesce in contact with both.

Briefly stated our invention comprises the herein described latex suitable for compounding into a finished floor polish anad also the complete floor polish. More specifically the invention comprises such latex and floor polish which includes an emulsion, i.e., dispersion, of an interpolymer of the monomer styrene and/or an alkyl acrylate ester with an ethenoid acid comonomer of which acrylic acid is an example; also shellac or like alkali soluble leveling resin; an agent such as dimethyl sulfoxide serving to cause coalescence of particles of the interpolymer and said resin anad formation of a continuous film; and alkali in amount to raise the pH above 7.

The resinous interpolymer is one that, at temperatures up to 90° C., is not film forming on evaporation of aqueous emulsions of it alone or with the dispersed coalescing agent. Examples of resinous interpolymers that meet this requirement and illustrate the class to be used are interpolymers of styrene, vinyl toluene, dimethyl or diethyl itaconate, methyl and ethyl acrylate and methacrylate or copolymers of two or more thereof, hereinafter sometimes referred to as the "main monomer" or "monomer," with an acidic comonomer such as an acrylic acid (i.e., acrylic or methacrylic acid), maleic, itaconic, crotonic, citraconic, and like alpha-unsaturated aliphatic carboxylic acids having 3-8 carbon atoms to the molecule.

The coalescing agent is an organic compound that is polar, soluble in water, in the said resinous interpolymer and in the alkali soluble resin to be described. It is a solvent for gaseous acetylene, this property serving as a test of the necessary solubility of the coalescing agent. Dimethyl sulfoxide gives results that are outstanding, including slow volatilization from the polish film after the agent has served the function of coalescing the other components of the film. Other examples of coalescing agents that illustrate the class to be used are dimethyl formamide, dimethyl acetamide, hexamethylphosphoramide, 2-pyrrolidone and N-methyl-2-pyrrolidone.

The surfactant is any one of the emulsifiers conventionally used in emulsion polymerization. Examples are sodium, potassium and ammonium lauryl sulfate, sodium octylnaphthalene and potassium dodecylbenzene sulfonates, diethyl or diamyl ester of sodium sulfosuccinic acid, tri(polyoxyethylene), sorbitan monolaurate (Span 20), glycerine monopalmitate, monoleate, and monostearate, like esters of sorbitol, polyoxyethylene derivatives of palmitic, oleic or stearic acid or of the corresponding alcohols having 15 or more, as up to 60, oxyethylene units to the molecule, polyoxyethylene sorbitan tristearate having 3-30 oxyethylene groups to the molecule, polyoxyethylene derivatives of alkyl phenols such as octyl or nonyl phenol with 15 to 100 oxyethylene units, and soaps of alkali metals and of morpholine, mono-, di-, and triethanol or other water soluble amine such as the monooleate, stearate, or palmitate, each of the said surfactants being used alone or in combination with others thereof.

In making the resinous interpolymer for the latex there is used to advantage about 2–10 and suitably 2–6 parts of the acidic comonomer for 100 parts of the said main monomer. With amounts of the comonomer much larger than 6 parts, there is loss of wet scrubbing resistance of the finished floor polish film. With less than about 2 parts of the comonomer, there is decreased free-thaw resistance of the latex on storage, imperfect coalescence of particles in the film, and also inadequate content of carboxy group for subsequent reaction with alkali in removing the film with an alkali detergent.

The interpolymerization of the styrene or other main monomer with the said acidic comonomer is made by any of the usual emulsion polymerization techniques. The aqueous medium used contains a surfactant. The monomers may be either present in toto from the start or added gradually. Initiation may be effected either thermally, as with a peroxy initiator, or by a redox system.

Examples of thermal initiators include potassium persulfate, hydrogen peroxide, azobisisobutyronitrile, benzoyl peroxide and like initiators of emulsion polymerization of the ethenoid compounds. Redox initiators are combinations of one of the oxidizing agents such as potassium persulfate, hydrogen peroxide or t-butyl hydroperoxide with a reducing agent such as sodium metabisulfite, sodium thiosulfate, various salts of formaldehyde sulfoxylic acid, ascorbic acid or a source of ferrous ion, e.g., ferrous ammonium sulfate. The whole composition is maintained at a temperature usual for the system with a particular initiator as, for example, at about 60°–90° C. for the thermally initiated system, until the interpolymerization is effected as under conditions illustrated in Example 1.

The latex as prepared may be converted to any desired level of alkalinity by the addition of any appropriate alkalizing agent. In alkalizing both the latex and also the complete floor polish we prefer to use a substance which is volatile so as not to remain in the finished floor polish film as, for instance, ammonium hydroxide, morpholine, and the lower alkanol amines, e.g., mono-, di-, or triethanolamine.

The water content of the latex is ordinarily about 40%–65% but may be varied to give any dilution desired in compounding the finished floor polish. It is necessary, however, to select the proportion of water which will promote the necessary stability of the emulsion during manufacture, storage and shipment, the term emulsion being used herein to include dispersion. We ordinarily use about 55%–60% of total water to obtain the stability and general economy of operation and shipment.

The latex so made is compounded into the finished floor polish with wax, alkali soluble resin or both.

As the wax we use a hard wax that is dispersible in alkaline aqueous solution, e.g., carnauba or a synthetic wax such as alkali dispersible polyethylenes of low molecular weight (around 2,000) oxidized to alkali dispersibility in water, as for instance in the material sold under the trade names A–C Polyethylene 629 and Epolene E. Such oxidized material is dispersible, for example, in water, containing ammonia at a pH above 7, as at 8–9, suitably the selected surfactant being admixed. Other waxes that we may use are candelilla, ouricury, oxidized microcrystalline and preferably mixtures of them with carnauba as in about equal proportions.

As the film leveling resin, we use one which is soluble in water or dispersible therein in presence of alkali; compatible with the said resinous interpolymer and non-separating therefrom in the dried film of the polish and which, furthermore, causes the film of the dried polish to lie flat after evaporation of the aqueous dispersion thereof. Examples that illustrate the class are shellac; alkali soluble maleic anhydride copolymers with styrene or vinyl ethers such as methyl or ethyl vinyl ether; the products of hydrolysis of the said maleic anhydride copolymers; the $C_1$–$C_4$ alkyl half esters of the said products of hydrolysis; terpene maleic anhydride condensation products; rosin adducts of polyesters, of which esters glycol and glycerin succinates, adipates and maleates are examples; and alkali soluble phenol and formaldehyde condensation products.

Proportions of the compounding materials are shown in the following table as proportions that are permissible and also those recommended, proportions here and elsewhere herein being expressed as parts by weight unless specifically stated to the contrary and, in this table, on the dry basis.

| Latex Components | Parts By Weight | |
|---|---|---|
| | Permissible | For Best Results |
| Latex solids | 100 | 100 |
| Coalescing agent | 2–30 | 5–20 |
| Wax | 0–140 | 2–75 |
| Alkali soluble resin | 0–300 | 25–100 |
| Surfactant | 0–5 | 1–3 |

The exact proportions of the several components to be used are selected, within the ranges stated, in accordance with the specific properties to be emphasized in the floor polish, as illustrated more specifically in the examples given later herein.

Thus the wax may be omitted entirely from the composition when the coalescing agent is dimethyl sulfoxide, dimethyl acetamide or hexamethylphosphoramide.

The mixings are made at ordinary temperatures, as by stirring the various materials into the said resinous copolymer in the reaction vessel used in making the copolymer. The wax and the alkali soluble resin are suitably admixed, in aqueous emulsions previously prepared separately for the two materials. It is convenient to have the latex at this stage at the ratio of solids to water which is desired in the finished floor polish and the emulsions of the wax and said resin as admixed also at the same concentration so that there is no change of the total solids ratios on mixing the three emulsions.

After thorough stirring of the mixed emulsions, the whole is ordinarily filtered as in a pressure filter or centrifuge of the cream separator type, to remove any oversize particles or lumps.

The invention will be further illustrated by description in connection with the following specific examples of the practice of it.

EXAMPLE 1

Floor polish is made from the composition and by the procedure that follows:

Composition

Latex components: Parts by weight
(1) Water, in this case deionized _____ 54.9
(2) Sodium lauryl sulfate _____ 1.7
(3) Styrene _____ 31.6
(4) Acrylic acid _____ 1.3
(5) Tertiary butyl hydroperoxide __ ⎤ redox ⎤ 0.4
(6) 1% aqueous solution of ascorbic ⎬ ⎬
acid _____ ⎦ ⎦ 4.2
(7) Aqueous ammonia (26% $NH_3$) _____ 0.7

Procedure

Place (1) and (2) in kettle. Agitate gently. When (2) is uniformly dispersed, add (3) and (4) slowly enough to ensure complete emulsification, then add (5). Continue stirring and sparge with a slow current of nitrogen for one-half hour or until emulsification is complete.

Maintain a nitrogen blanket throughout the reaction and add (6) gradually. After the exotherm begins, maintain the mixture for about 70 minutes. The temperature will then have leveled off at about 60°–70° C. and the interpolymerization of the styrene and acrylic acid will have been substantially completed.

Then adjust the pH to 8.5 by addition of sufficient ammonia such as the amount in (7).

The "Latex" made as above is used as the base and compounded into floor polish, as follows:

Component: Parts by weight
Latex made as described above, solids basis___ 50
Polytheylene oxidized to alkali dispersible condition, AC–629 _____ 25
Shellac _____ 25
Dimethyl sulfoxide (coalescing agent) _____ 7.5
Water, total in above components _____ 615

EXAMPLE 2

The procedure and composition of Example 1 are used except that the dimethyl sulfoxide as coalescing agent is replaced by an equal weight of hexamethylphosphoramide.

EXAMPLE 3

The composition and procedure of Example 1 are followed except that the styrene there used is replaced by an equal weight of methyl methacrylic. In another modification of Example 1, the styrene there used is replaced by an equal weight of a mixture of 15.8 parts of styrene and 15.8 parts of methyl methacrylate, other components and the processing being exactly as described in Example 1.

EXAMPLE 4

The composition and procedure of Example 1 are used except that the styrene is replaced by an equal weight of methyl methacrylate and the acrylic acid by equal weights of methacrylic acid, itaconic, maleic, crotonic and citraconic acids, used separately and in turn.

EXAMPLE 5

The composition and procedure of Example 2 are followed except that the dimethyl sulfoxide there used as the coalescing agent is replaced by an equal weight of dimethyl formamide, dimethyl acetamide, and hexamethylphosphoramide, used separately and in turn.

EXAMPLE 6

The composition and procedure of Example 1 are used except that the wax is omitted.

EXAMPLE 7

The composition and procedure of Example 1 are used except that 7 parts of the coalescing agent, dimethyl sulfoxide, are admixed, the polyethylene reduced to 12 parts, and the shellac replaced by 50 parts of ethylene glycol ester of terpene-maleic anhydride adduct. This is an alkali soluble resin. The floor polish so made is particularly resistant to staining by black shoe heels.

The terpene here may be any one of the terpenes, o-cymene, myrcene, alpha-terpinene, d-limonene, delta-carene, sabinene, alpha-pinene, and camphane or mixtures there of such as constitute any naturally occurring terpene.

The terpene adduct and its glycol partial ester are made in manner usual for this adduct and the ester. The terpene such as terpinolene may be mixed with an equimolecular proportion of maleic anhydride and warmed to give the terpene-maleic anhydride adduct. The heating is continued until the adduct is polymerized. Then the resin so made is esterified with ethylene glycol, as with about 80%–90% of the quantity of the glycol required to esterify all of the carboxyl groups, the esterification being accelerated if desired by the inclusion of about 0.2% of toluene sulfonic acid and by heating in an open vessel at a temperature above the boiling point of water, as at 120°–160° C. to distil out water as formed in the esterification. This leaves unesterified carboxyl groups in number to form a soluble salt with the alkali which we add to our polish.

EXAMPLE 8

The compositon and procedure of Example 1 are used except that the alkali soluble resin there used is replaced by an equal weight of an alkali soluble phenol formaldehyde condensate from the alkaline condensation of 1 mole of phenol with about 1.5–2.5 moles of formaldehyde, the condensation being conducted to the alkali soluble resole stage.

EXAMPLE 9

The procedure and composition of Example 1 were followed except that the amount of the total weight of the styrene and acrylic acid, which make an interpolymer is about 50 parts. All components were blended to a dispersion of 14% solids content and 7 parts of the coalescing agent dimethyl sulfoxide are incorporated.

The product so made is particularly resistant to wet scrubbing.

EXAMPLE 10

The procedure and composition of Example 1 are used except that the oxidized polyethylene wax component there used is replaced, by an equal weight of carnauba, candelilla, ouricury wax, and a mixture of candelilla and ouricury in equal weights, the several replacements being used separately and in turn.

In the above examples, the components used in making the compounded floor polish including the wax and the alkali soluble resin, as well as the latex, are suitably emulsified in water with sufficient ammonium hydroxide to make the pH of the total emulsion approximately 8.5. The techniques and equipment used in making the separate emulsions and then mixing them together are conventional.

When the several components have been compounded, then the whole is subjected to filtration or centrifugation as described.

Polishes made as described herein and illustrated in the examples are satisfactory in gloss, resistant to wet scrubbing, and ready removability as by an alkaline detergent.

The latex alone when applied to the surface does not form a continuous film. Instead it gives a somewhat granular deposite that can be rubbed off in part into a powder with the hand. The mixture of the latex with the alkali soluble resin, on the other hand, gives a continuous film either with or without the inclusion of the wax component. The addition of the wax improves the leveling and susceptibility to development of high gloss on buffing.

It will be understood that it is intended to cover all changes and modifications of the examples of the invention herein chosen for the purpose of illustration which do not constitute departures from the spirit and scope of the invention.

We claim:
1. A polish comprising
   (a) an aqueous emulsion including an interpolymer of 100 parts by weight of a monomer component selected from the group consisting of styrene, methyl and ethyl acrylate and methacrylate, dimethyl and diethyl itaconate, vinyl toluene and mixtures thereof with about 2–10 parts by weight of an alpha-unsaturated aliphatic acid comonomer having 3–8 carbon atoms to the molecule;
   (b) an alkali soluble leveling resin compatible with the said interpolymer and non-separating therefrom in the dried form of the said polish causing such to lie flat after evaporation of the aqueous emulsion thereof;
   (c) an admixed coalescing agent selected from the group consisting of dimethyl sulfoxide, dimethyl formamide, dimethyl acetamide, hexamethylphosphoramide, 2-pyrollidone and N-methyl-2-pyrollidone, the proportion of the coalescing agent being about 2–30 parts by weight for 100 parts of solids in said emulsion and the coalescing agent serving to cause coalescence of said interpolymer with said resin as water evaporates from a film of the polish; and
   (d) an alkali in amount to render the polish alkaline.
2. The polish of claim 1, said comonomer being selected from the group consisting of acrylic, methacrylic, itaconic, maleic, crotonic, and citraconic acids.
3. The polish of claim 1, including a floor polish wax admixed in the proportion of 2–140 parts by weight for 100 parts of solids in said emulsion.
4. The polish of claim 3, said wax being carnauba.
5. The polish of claim 1, said coalescing agent being dimethyl sulfoxide.
6. The polish of claim 1, said coalescing agent being hexamethylphosphoramide.
7. The polish of claim 2, said coalescing agent being dimethyl formamide.
8. The polish of claim 1, said alkali soluble resin being shellac.
9. The polish of claim 1, said alkali soluble resin being selected from the group consisting of shellac, copolymers of maleic anhydride with a comonomer selected from the group consisting methyl vinyl and ethyl vinyl ethers, hydrolysis products of said copolymers, $C_{1-4}$ alkyl half esters of said hydrolysis products, condensation products of terpene with maleic anhydride, rosin adducts of glycol and glycerin succinates, adipates and maleates, and alkali soluble phenolformaldehyde condensates.

References Cited by the Examiner
UNITED STATES PATENTS

| | | | |
|---|---|---|---|
| 2,606,165 | 8/1952 | Chapin et al. | 260—28.5 |
| 2,695,277 | 11/1954 | Pabst et al. | 260—28.5 |
| 2,733,224 | 1/1956 | Smith et al. | 260—28.5 |
| 3,094,502 | 6/1963 | Farago | 260—30.8 |

MORRIS LIEBMAN, *Primary Examiner.*